Patented Aug. 13, 1946

2,405,724

UNITED STATES PATENT OFFICE 2,405,724

DISPERSIONS OF NEOPRENE IN AQUEOUS MEDIA

Frank N. Wilder, Woodstown, N. J., assignor to E. I. du Pont de Nemours & Company, Wilmington, Del., a corporation of Delaware No Drawing. Application July 1, 1942,
Serial No. 449,353

11 Claims. (Cl. 260—8)

This invention relates to the treatment of dispersions of neoprene-in-aqueous media and, more particularly, to a method for concentrating such dispersions.

It is known that when natural rubber latex is treated with a so-called creaming agent such as a protein or similar water-soluble organic colloid, the dispersed rubber rises through the dispersion, forming, as a distinct layer, a dispersion more concentrated with respect to rubber than the original latex, while the lower layer contains a large proportion of the water-soluble materials originally present, but practically none of the rubber. Since the two layers may be readily separated, rubber latex may be both concentrated and purified by this method. Not only are colloidal substances of many different types effective as creaming agents, but they may also be applied successfully over a wide range of concentrations of both the latex and the agent.

When it is attempted, however, to apply these methods and agents to dispersions of neoprene-in-aqueous media with the object of purification and concentration, separation into two layers does not, in general, occur. This is not surprising, since the artificial dispersions of neoprene differ radically in a number of important respects from natural rubber latex. Thus, the particles of neoprene are very much smaller than those of natural rubber latex and are believed to be of uniform composition throughout, whereas the particles of natural latex are commonly held to be composed of a solid elastic shell surrounding a fluid interior. Furthermore, the dispersing agent for the neoprene dispersion is a soap or a soap-like material, (usually a sodium salt), whereas, in the case of natural latex, the dispersing agent is a protein. This is a particularly important distinction since, according to recent findings (see Bondy, Transactions of the Faraday Society 35, 1093 (1939)), "Creaming agents exert a dehydrating influence on the absorbed stabilizing protein film, thereby causing the rubber particles to adhere to one another." Thus, since creaming appears from this to depend specifically on the presence of proteins, it is not to be expected that dispersions which contain, instead of proteins, the quite unrelated synthetic dispersing agents, would behave like natural latex by the addition of creaming agents. As a matter of fact, attempts to concentrate dispersions of neoprene by creaming were for along time unsuccessful and led many to the conclusion that such dispersions could not be creamed. Neoprene is a generic term for chloroprene polymers either unmodified or modified by polymerizing in the presence of lesser amounts of other materials which may or may not be polymerizable; e. g., sulfur, hydrogen sulfide, methyl methacrylate, isoprene, etc. The modification of chloroprene polymers is extensively described in the literature and prior patents. Dispersion of neoprene-in-aqueous media means aqueous dispersions of neoprene, the dispersions containing dispersing agents, and possibly modifiers such as anti-oxidants, etc.

An object of the invention is, therefore, to provide a method for concentrating and purifying dispersions of neoprene-in-aqueous media by removing a part of the aqueous phase. Another object is to discover agents capable of concentrating dispersions of neoprene-in-aqueous media. Other objects will appear hereinafter.

It has been found that these objects may be accomplished by treating these dispersions of neoprene-in-aqueous media with aqueous solutions of alginates in proportions selected according to the concentration of the dispersion so that, for each 100 grams of aqueous phase of the dispersion to be treated, the weight of alginate added (in grams) is 0.006 to 0.030 times the differences between seventy and the concentration in per cent of the non-aqueous phase of the original dispersion.

It has been further found that the amount of alginate added may be reduced when there is also present in the dispersion an alcohol such as cyclohexanol having a solubility in water of from about 1 to about 20 per cent at ordinary temperature. Moreover, the process is applicable only to dispersions in which the particles of neoprene are negatively charged.

Expressed algebraically, the amount of alginate may be determined by the formula:

$$A = KB(3-C)(70-D)$$

wherein A is the alginate in parts by weight, B is the aqueous phase in parts by weight, C is the alcohol in per cent of the dispersed phase, D is the dispersed phase in per cent of the dispersion, and K is a coefficient whose value is within the range 0.00002 and 0.00010.

In order that the process may be more fully understood, the following specific examples are given by way of illustration, but the invention is not limited thereto as will become more apparent hereinafter.

Example I

The dispersion to be treated was prepared as follows: Chloroprene (100 parts) containing 0.25 part of sulfur, 4 parts of rosin, and 2 parts of cyclohexanol was emulsified by mechanical agitation in 100 parts of water containing 0.8 part of sodium hydroxide, 0.25 part of ammonium persulfate, 0.5 part of C-cetyl betaine, and 0.5 part of the sodium salt of dinaphthylmethane sulfonic acid prepared according to U. S. Patent No. 1,336,759. The dispersion was kept at 40° C. until polymerization was substantially complete and was then treated with 0.5 part of diethanolamine. The resulting 50 per cent dispersion was creamed by the addition with good stirring of 20 parts of a 0.5 per cent aqueous solution of ammonium alginate. On standing, the dispersion rapidly separated into two distinct layers, the upper one brown and almost clear. After 24 hours, this layer amounted to about 18 per cent of the original volume. The lower layer resembled the original latex in appearance, but was somewhat more viscous. Analysis showed it contained 60 per cent of solid material by weight. The upper layer was separated by decantation.

Example II

Two hundred (200) parts of a dispersion of neoprene-in-aqueous media prepared as in Example I was treated with 20 parts of a 0.5 per cent aqueous solution of ammonium alginate which also contained 0.5 per cent of the sodium salts of the sulfation product of a mixture of straight-chain primary aliphatic alcohols with an average chain length of 13 carbon atoms. The lower layer which separated had a solids content of 62.5 per cent.

Example III

A dispersion of neoprene-in-aqueous media was prepared as described in Example I except that the proportion of water was 150 parts so as to give the dispersion, before treatment, a solids content of 40 per cent. One hundred (100) parts of this dispersion was treated with 9 parts of a 1 per cent aqueous solution of ammonium alginate (which also contained 0.5 per cent of the sodium salts used in Example II) so as to give 0.15 per cent of ammonium alginate based on the water content of the original latex. The analysis showed 60 per cent solids in the lower layer.

Similarly, 100 parts of 30 per cent dispersion similar to that used in Example III was concentrated to 55 per cent by the addition of 14 parts of 1 per cent alginate solution. A 20 per cent dispersion was concentrated to 50 per cent by 20 parts of alginate solution and a 10 per cent dispersion was concentrated to 38 per cent and, on long standing, to 47 per cent by the use of 27 parts of the alginate solution per 100 parts of dispersion treated. It will be noted that, in each case, the amount of ammonium alginate added is calculated from the equation $$A = 0.00005B(3-C)(70-D)$$

given above for the treatment of dispersions containing, as these did, 2 per cent of cyclohexanol based on the neoprene.

Example IV

The dispersion to be treated was prepared by emulsifying 100 parts of chloroprene containing 0.25 part of sulfur and 4 parts of rosin in 150 parts of water containing 0.8 part of sodium hydroxide and 0.25 part of ammonium persulfate. The polymerization was carried out at 40° C. until substantially complete. The resulting 40 per cent dispersion after stabilization with 0.5 part of diethanolamine was treated with 67.5 parts of 1 per cent ammonium alginate solution (27 parts per 100 parts of latex to be treated). After standing for 6 hours, the concentration of solids in the lower layer was 50 per cent.

Similarly, a 30 per cent dispersion prepared like the one used in Example IV, except for a different proportion of water, was concentrated to 45 per cent by the addition of 42 parts of the 1 per cent ammonium alginate solution for each 100 parts of the dispersions to be treated and a 20 per cent dispersion was concentrated to 40 per cent by the addition of 60 parts.

It will be noted that, in each case in Example IV, the quantity of ammonium alginate added is calculated from the equation $$A = 0.00015B(70-D)$$

the $KB(3-C)$ being consolidated for dispersions containing no cyclohexanol; i. e., where $C=0$, and K being given a value of 0.00005.

Example V

A 50% aqueous dispersion of neoprene prepared as described in Example I was continuously mixed with 75 grams of a 1% aqueous solution of ammonium alginate for each kilogram of dispersion and introduced continuously into a Sharples centrifuge with a bowl of 250 cc. capacity, similar to that described in Liddell's Handbook of Chemical Engineering, McGraw-Hill Book Co., New York, 1922, page 310. When the rate of feed was adjusted so that the dispersion remained in the bowl for 4 minutes, and the speed of rotation was 22,000 revolutions per minute, the denser layer delivered continuously from the apparatus contained 60% of solid material by weight, but retained all the characteristics of a dispersion. The less dense layer contained only negligible amounts of the dispersed neoprene. This process differs from more conventional centrifuging in that the denser layer is the desirable product.

The process can be applied to any neoprene dispersion in which the particles are negatively charged. Accordingly, the dispersing agent can be any having an anionic solubilizing group. Examples are water-soluble salts (usually sodium, potassium, or ammonium) of oleic acid, abietic acid, alkyl naphthalene sulfonic acids, dinaphthyl methane sulfonic acids, and long-chain alkyl sulfuric acids.

As suggested above, the proportion of ammonium alginate, or other alginate, added is somewhat critical. Thus, if considerably smaller quantities than indicated in the above examples are used, the separation is very incomplete and much of the neoprene remains in the upper layer. On the other hand, if the proportion of agent is considerably increased, the rate at which the process takes place is objectionably retarded, even though the final result may be satisfactory. There is, therefore, a range of concentration of agent, given by the equation when K is a value within the range 0.00002 and 0.00010, within which good results can be obtained. It is obvious from the above discussion that lower proportions of the concentrating agent can be used, that is, the value of K in the equation may be reduced as far as 0.00002, when speed is more important than obtaining the maximum concentration and complete recovery of the neoprene. On the other hand, larger proportions can be used, that is, the value of K may be increased up to 0.00010, when speed is relatively unimportant or when the separation is accelerated either by increasing the temperature or increasing the force acting upon the particles, as by the use of a centrifuge. The most suitable range for K is about 0.00005 to about 0.00008, while values of about 0.000075 are particularly preferred.

As concentrating agent for dispersions of neoprene, the water-soluble alginates such as sodium and potassium alginates and particularly ammonium alginate, are preferred. Alginates which have not suffered extensive degradation during their preparation and which, accordingly, give viscous aqueous solutions, are also preferred.

The following agents which have been reported to cream natural latex were tried for neoprene dispersions, in most cases in several different proportions chosen in the light of experience with the use of alginates, and were found to produce no creaming: gum arabic, egg albumen, blood albumen, agar, gum mastic, Iceland moss, and ethyl cellulose.

The following, tried in the same way, gave only a trace of creaming: gelatin, pectin, soluble starch, glue, and wheat gluten.

In the above examples, the concentrating agent is usually added in the form of a 1.0 or 0.5 per cent aqueous solution; although addition as solids can be used if proper precautions to insure solution in the dispersion are used. More concentrated solutions are usually too viscous to be readily incorporated into the latex without local flocculation. On the other hand, more dilute solutions must, of course, be used in large amounts and, hence, considerably dilute the system with water and reduce the concentration obtainable. In some of the above examples, a solution containing both alginate and a sodium salt of a sulfated higher alcohol are used. The latter reduces the viscosity of the solution and, hence, makes it easier to incorporate into the latex, and also reduces the viscosity of the latex, making the separation more rapid. Unlike natural latex, however, the dispersions such as are treated in the present invention, are not concentrated by the addition of the sulfates alone. Other surface-active agents such as sodium oleate, dinaphthylmethane sodium sulfonate, sodium dibutyl dithiocarbamate, and the alkalis have similar effects.

Temperatures between 15° C. and 30° C. are usually preferred for carrying out the process of this invention, although both higher and lower temperatures may also be used to an advantage under certain conditions. Increasing the temperature increases the rate of separation without, in general, altering the extent to which the separation may ultimately proceed. For this reason, when working at temperatures higher than the 25° C., the best practical conditions may involve a somewhat higher proportion of agent than given by the equation and more concentrated products may be obtained.

As shown by the examples and by the equations, the presence of cyclohexanol reduces the proportion of alginate required for best results. Other alcohols or ketones having solubilities in water between about 1 and about 20 per cent at ordinary temperatures can also be used. Suitable examples of members of this class are n-butanol, n-octanol, methyl cyclohexanol, methyl cyclohexanone, n-hexanol, benzyl alcohol, methyl butyl ketone, and diethyl ketone. The alcohol or ketone can be used in amounts up to 2.5 per cent based on the dispersed phase. Larger amounts of alcohol or ketone are not within the scope of this invention. The alcohol or ketone or mixture of the two can be added either before, during, or after the polymerization of the chloroprene. The use of 2 per cent of cyclohexanol is a preferred embodiment of the invention.

The two layers formed in the process of the present invention can be separated by any appropriate mechanical means such as decantation or syphoning of the upper layer, or removal of the lower layer in a separatory funnel or similar device. As mentioned above, the rate of separation can be increased by increasing the force acting upon the particles, as by centrifuging. The operation can be made continuous by mixing continuous streams of the latex to be treated and the alginate solution or other agent in appropriate proportions and then passing them continuously through any form of continuous centrifuge known in the prior art. It is sometimes advantageous, particularly when a very concentrated latex is desired, to carry out the process in two or more steps; that is, to treat the partly concentrated dispersion with a further quantity of agent. When purification of the dispersion is the principal object, it is sometimes advantageous to use an alginate solution more dilute than 0.5 per cent or to dilute the latex with water before adding the agent since it has been found that the water-soluble material has the same concentration in the aqueous phase of the lower layer as in the clear upper layer. Hence, the larger the relative proportion of the clear layer, the greater is the removal of water-soluble materials from the lower layer containing the dispersed chloroprene polymer. Repeated treatments will still further reduce the proportion of water-soluble material associated with the chloroprene polymer.

A method for removing a portion of the aqueous phase of dispersion of neoprene has been developed and can be used for concentrating such dispersions or for purifying them or for both purposes together. It thus gives a commercially practical method for obtaining aqueous neoprene dispersion of substantially greater concentration than 50 per cent. Other methods proposed for preparing such dispersions are less suitable for large scale production. Thus, it is usually very difficult or impossible on a large scale to prepare these more concentrated dispersions directly by dispersing the chloroprene in the required small volume of water and then polymerizing, because of the large quantity of heat which must be removed from the small volume of dispersion in order to keep the temperature under control. Similarly, the concentration of aqueous dispersion of neoprene by evaporation or distillation is very troublesome because of excessive foaming caused by the dispersing agents which must be used and, moreover, causes an increase in the concentration of the water-soluble impurities in the aqueous phase.

An advantageous combination of the concentration and purification features of the process of the present invention is brought about when 40 per cent dispersion is prepared and then creamed to 50 per cent or higher. As compared with a 50 per cent dispersion, prepared directly by polymerization, this dispersion contains less water-soluble impurities and is more readily prepared since the polymerization of the 40 per cent dispersion is much more readily controlled than at 50 per cent.

It will be seen that the above equations represent straight-line relationship between the concentration of the latex and the proportion of alginate to be added. In both cases, when $D=70$, $A=0$, or in other words, a 70 per cent latex, cannot, according to this, be further concentrated. This value is fairly close to the theoretical value for the percentage of space occupied by incompressible spheres of equal size arranged in the most tightly packed manner; that is, the highest concentration of latex theoretically possible, assuming uniform, incompressible, spherical particles. It will be further seen that the curves corresponding to these equations differ only in their slope which is related to the proportion of the cyclohexanol. Curves for other systems containing other proportions of cyclohexanol or other alcohols or ketones likewise have the same form and differ only in slope.

It is apparent that many widely different embodiments of this invention may be made without departing from the spirit and scope thereof, and, therefore, it is not intended to be limited except as indicated in the appended claims.

I claim:

1. A process for concentrating a polychloroprene-in-aqueous medium dispersion wherein the polychloroprene particles are negatively charged, which dispersion contains up to 2.5 per cent based on the weight of the dispersed phase of water soluble compound of the class consisting of alcohols, ketones and mixtures of such alcohols and ketones having a water-solubility at ordinary temperatures of about from 1 to 20 per cent which comprises adding to such dispersion an amount of a water-soluble alginate determined by the formula $$A=KB(3-C)(70-D)$$

wherein A is the alginate in parts by weight, B is the aqueous phase in parts by weight, C is the water soluble compound of the class consisting of alcohols, ketones and mixtures of the same in per cent of the dispersed phase, D is the dispersed phase in per cent of the dispersion, and K is a coefficient whose value is within the range 0.00002 to 0.00010.

2. A process for concentrating a polychloroprene-in-aqueous medium dispersion wherein the polychloroprene particles are negatively charged, which dispersion contains up to 2.5 per cent based on the weight of the dispersed phase of an alcohol having a water solubility at ordinary temperatures of about from 1 to 20 per cent which comprises adding to such dispersion an aqueous solution containing an amount of a water-soluble alignate determined by the formula $$A=KB(3-C)(70-D)$$

wherein A is the alginate in parts by weight, B is the aqueous phase in parts by weight, C is the alcohol in per cent of the dispersed phase, D is the dispersed phase in per cent of the dispersion, and K is a coefficient whose value is within the range 0.00002 to 0.00010, and separating the denser layer by centrifuging.

3. A process for concentrating a polychloroprene-in-aqueous medium dispersion wherein the polychloroprene particles are negatively charged, which dispersion contains up to 2.5 per cent based on the weight of the dispersed phase of an alcohol having a water solubility at ordinary temperatures of about from 1 to 20 per cent which comprises adding to such dispersion an aqueous solution containing an amount of a water soluble alginate determined by the formula $$A=KB(3-C)(70-D)$$

wherein A is the alginate in parts by weight, B is the aqueous phase in parts by weight, C is the alcohol in per cent of the dispersed phase, D is the dispersed phase in per cent of the dispersion, and K is a coefficient whose value is within the range 0.00002 to 0.00010.

4. A process for concentrating a polychloroprene-in-aqueous medium dispersion wherein the polychloroprene particles are negatively charged, which dispersion contains up to 2.5 per cent based on the weight of the dispersed phase of an alcohol having a water solubility at ordinary temperatures of about from 1 to 20 per cent which comprises at a temperature of 15° C. to 30° C. adding to such dispersion an aqueous solution containing an amount of a water soluble alginate determined by the formula $$A=KB(3-C)(70-D)$$

wherein A is the alginate in parts by weight, B is the aqueous phase in parts by weight, C is the alcohol in per cent of the dispersed phase, D is the dispersed phase in per cent of the dispersion, and K is a coefficient whose value is within the range 0.00002 to 0.00010, said solution also containing a small amount of a surface-active agent.

5. A process for concentrating a polychloroprene-in-aqueous medium dispersion wherein the polychloroprene particles are negatively charged, which dispersion contains up to 2.5 per cent based on the weight of the dispersed phase of cyclohexanol which comprises at a temperature of 15° C. to 30° C. adding to such dispersion an aqueous solution containing an amount of a water soluble alginate determined by the formula $$A=KB(3-C)(70-D)$$

wherein A is the alginate in parts by weight, B is the aqueous phase in parts by weight, C is cyclohexanol in per cent of the dispersed phase, D is the dispersed phase in per cent of the dispersion, and K is a coefficient whose value is within the range 0.00002 to 0.00010.

6. A process for concentrating a polychloroprene-in-aqueous medium dispersion wherein the polychloroprene particles are negatively charged, which dispersion contains up to 2.5 per cent based on the weight of the dispersed phase of cyclohexanol, which comprises at a temperature of 15° C. to 30° C. adding to such dispersion an aqueous solution containing an amount of water soluble alginate determined by the formula $$A=KB(3-C)(70-D)$$

wherein A is the alginate in parts by weight, B is the aqueous phase in parts by weight, C is cyclohexanol in per cent of the dispersed phase, D is the dispersed phase in percent of the dispersion, and K is a coefficient whose value is within the range 0.00002 to 0.00010, said solution also containing a small amount of a sodium salt of a sulfated higher alcohol.

7. A process for concentrating a polychloroprene-in-aqueous medium dispersion wherein the polychloroprene particles are negatively charged, which dispersion contains about 2 per cent based on the weight of the dispersed phase of cyclohexanol which comprises at a temperature of about 25° C. adding to such dispersion a 0.5 to 1 per cent aqueous solution of approximately an amount of a water soluble alginate determined by the formula $$A=0.000075B(3-C)(70-D)$$

wherein A is the alginate in parts by weight, B is the aqueous phase in parts by weight, C is cyclohexanol in per cent of the dispersed phase, and D is the dispersed phase in per cent of the dispersion.

8. A process for concentrating a polychloroprene-in-aqueous medium dispersion wherein the polychloroprene particles are negatively charged, which dispersion contains about 2 per cent based on the weight of the dispersed phase of cyclohexanol which comprises at a temperature of about 25° C. adding to such dispersion a 0.5 to 1 per cent aqueous solution of approximately an amount of a water soluble alginate determined by the formula $$A = 0.000075 B (3-C)(70-D)$$

wherein A is the alginate in parts by weight, B is the aqueous phase in parts by weight, C is cyclohexanol in per cent of the dispersed phase, and D is the dispersed phase in per cent of the dispersion, said solution also containing a small amount of a sodium salt of a sulfated higher alcohol.

9. A process for concentrating a polychloroprene-in-aqueous medium dispersion wherein the polychloroprene particles are negatively charged, which dispersion contains about 2 per cent based on the weight of the dispersed phase of cyclohexanol which comprises at a temperature of about 25° C. adding to such dispersion a 0.5 to 1 per cent aqueous solution of approximately an amount of ammonium alginate determined by the formula $$A = 0.000075 B (3-C)(70-D)$$

wherein A is the alginate in parts by weight, B is the aqueous phase in parts by weight, C is cyclohexanol in per cent of the dispersed phase, and D is the dispersed phase in per cent of the dispersion, and separating the denser layer by centrifuging.

10. A process for concentrating a polychloroprene-in-aqueous medium dispersion wherein the polychloroprene particles are negatively charged, which dispersion contains about 2 per cent based on the weight of the dispersed phase of cyclohexanol which comprises at a temperature of about 25° C. adding to such dispersion a 0.5 to 1 per cent aqueous solution of approximately an amount of ammonium alginate determined by the formula $$A = 0.000075 B (3-C)(70-D)$$

wherein A is the alginate in parts by weight, B is the aqueous phase in parts by weight, C is cyclohexanol in per cent of the dispersed phase, and D is the dispersed phase in per cent of the dispersion, said solution also containing a small amount of a sodium salt of a sulfated higher alcohol.

11. A continuous process for concentrating a polychloroprene-in-aqueous medium dispersion wherein the polychloroprene particles are negatively charged, which dispersion contains up to 2.5 per cent based on the weight of the dispersed phase of an alcohol having a water solubility at ordinary temperatures of about from 1 to 20 per cent which comprises continuously passing said dispersion into a mixing zone, continuously adding to such dispersion in the mixing zone an aqueous solution of a water-soluble alginate in such amount that the alginate is present in an amount determined by the formula $$A = KB(3-C)(70-D)$$

wherein A is the alginate in parts by weight, B is the aqueous phase in parts by weight, C is the alcohol in per cent of the dispersed phase, D is the dispersed phase in per cent of the dispersion, and K is a coefficient whose value is within the range 0.00002 to 0.00010, and continuously separating the mixture into a concentrated and a dilute phase by centrifuging the mixture.

FRANK N. WILDER.